Figure 1:
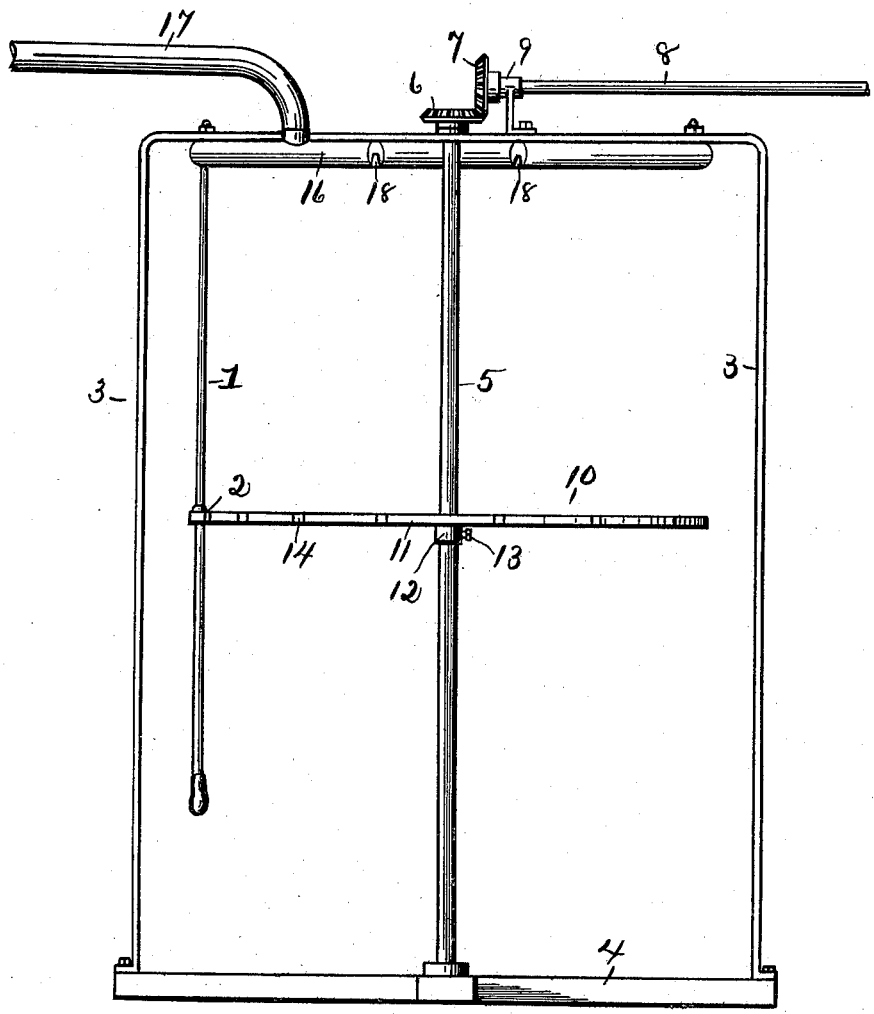

(No Model.)  3 Sheets—Sheet 1.
M. J. OWENS.
APPARATUS FOR BLOWING GLASS.

No. 534,840. Patented Feb. 26, 1895.

WITNESSES
Carroll J. Webster
Floyd R. Webster

INVENTOR
Michael J. Owens
By William Webster
Atty

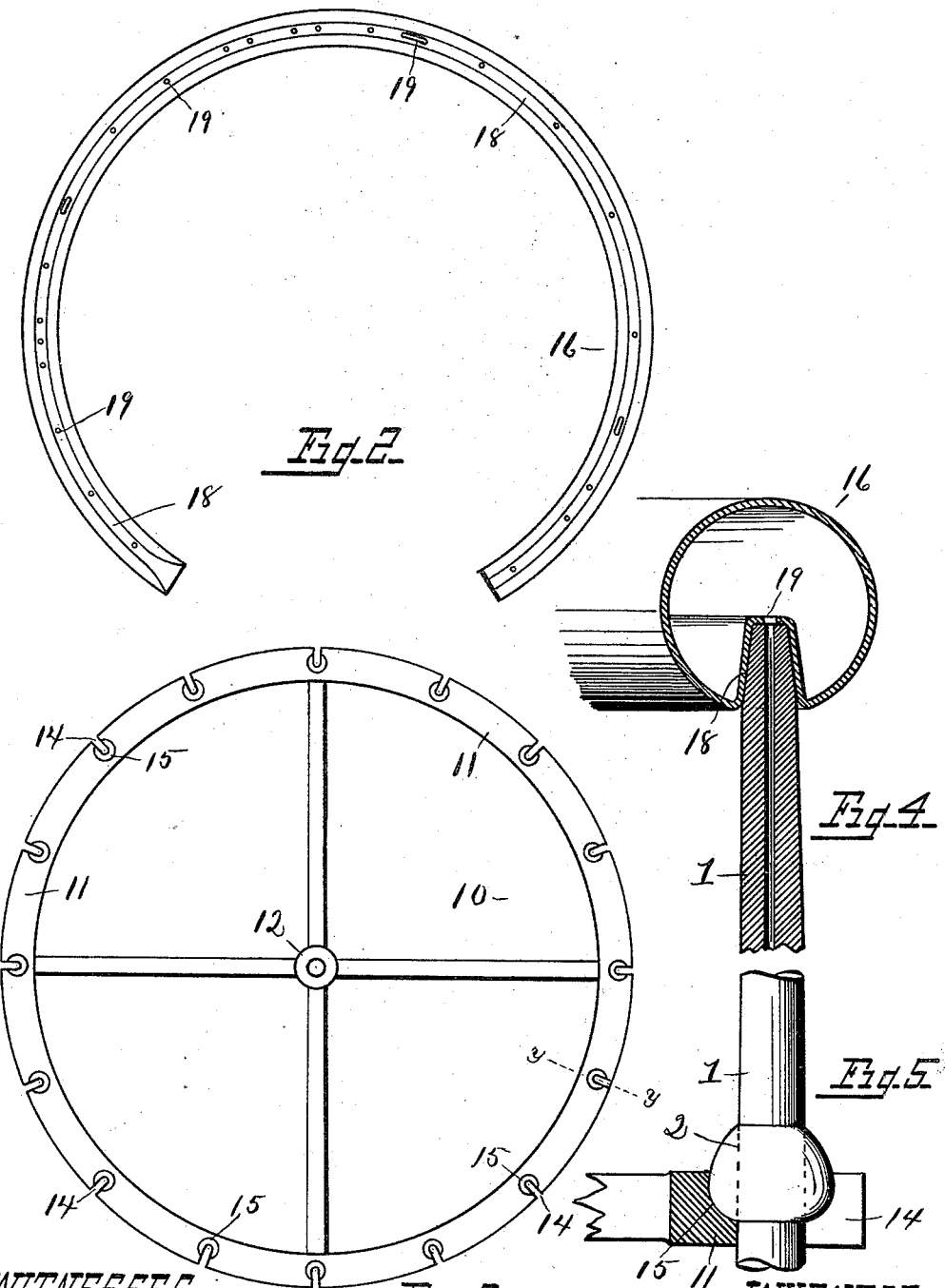

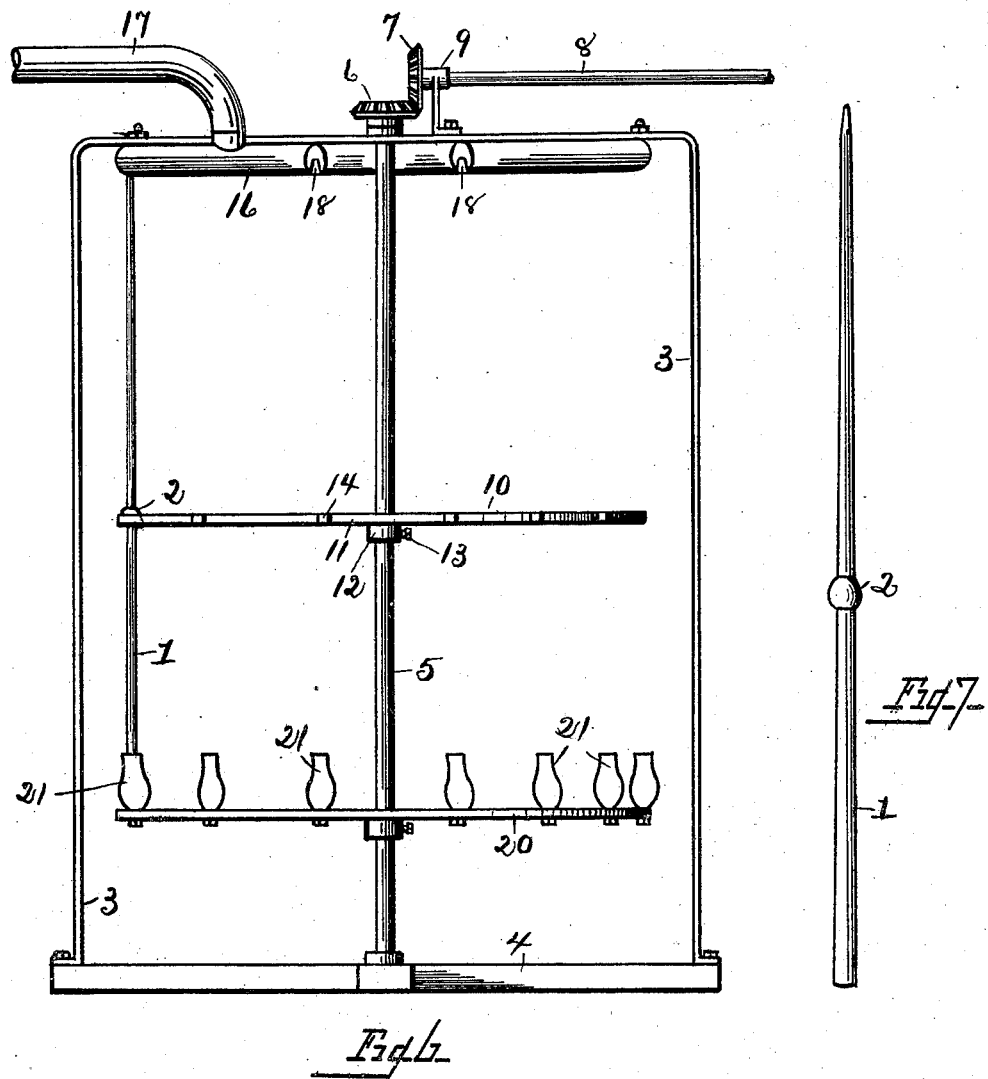

UNITED STATES PATENT OFFICE.

MICHAEL J. OWENS, OF TOLEDO, OHIO.

APPARATUS FOR BLOWING GLASS.

SPECIFICATION forming part of Letters Patent No. 534,840, dated February 26, 1895.

Application filed January 30, 1894. Serial No. 498,452. (No model.)

*To all whom it may concern:*

Be it known that I, MICHAEL J. OWENS, of Toledo, county of Lucas, and State of Ohio, have invented certain new and useful Improvements in Apparatus for Blowing Glass; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an apparatus for blowing glass, and has for its object to perform mechanically, what has heretofore been done manually.

The invention consists in providing an apparatus which shall receive a blow pipe and mechanically blow the glass thereon into the desired form.

The invention further consists in the parts as shown, described and pointed out in the claims.

In the drawings: Figure 1 is a front elevation of the glass blowing apparatus, constructed in accordance with my invention. Fig. 2 is a bottom plan view of the air receptacle, showing the guide way for the blow pipe and the recess therein by which the air is led into the blow pipe as it passes under the same. Fig. 3 is a sectional plan view illustrating the revoluble holder for the blow pipe, also showing sockets by which the blow pipe is held. Fig. 4 is a sectional elevation of the air receptacle showing the guide way and the upper end of the blow pipe in position therein. Fig. 5 is a sectional view of the revoluble holder on lines *y—y*, Fig. 3, showing the blow pipe as secured therein. Fig. 6 is a front elevation of my device showing a modification comprising a revoluble carrier having molds thereon. Fig. 7 is a detail view of the blow pipe.

Heretofore in the art of blowing glass, there has been a blower necessary, who manually blows the article into the desired form, there being a gathering boy to secure the gathering upon the pipe previous to blowing, and remove the moil after the article is formed and removed from the pipe.

This invention has for its object to mechanically blow the glass and dispense with the blower, it only being necessary for the gathering boy to secure the gathering upon the pipe and place it upon the apparatus and remove the same when the article has assumed the desired shape.

In carrying out my invention, I preferably use the present form of blow pipe 1, forming thereon an enlargement 2, but while I have shown and described the present form of blow pipe, it will be obvious that any desired form of blow pipe may be used.

The apparatus for blowing glass consists in the frame 3, having a base 4, in which is journaled a shaft 5 having a beveled gear 6 secured thereon, there being a like beveled gear 7 meshing therewith secured upon a shaft 8 journaled in box 9, secured to the frame, said shaft receiving motion from any preferred source of power. Secured upon shaft 5 is a revoluble holder 10 which comprises the annular ring 11 having a hub 12, there being a set screw 13 by which to secure the same upon the shaft 5. In the ring 11 and at regular intervals around the same are recesses 14, there being a cup-shaped depression 15 in the top of the ring in which the enlargement 2 upon the blow pipe seats to secure the blow pipe in position, the body of the pipe being inserted through recess 14. Secured upon the under side of the frame 3, is an air receptacle 16, there being a feed pipe 17 leading into the same, said feed pipe being connected with any source of air supply, either fan or the usual air pipe now employed to lead cool air around the cupola to the operators. The air receptacle 16 has a guide way 18 upon the under side of the same, shown in Fig. 4, in which the upper end of the blow pipe fits and moves when the revoluble holder 10 is revolved. In the upper portion of the guide way are openings 19 which communicate with the interior of the same, said openings being in a vertical line with the center of the blow pipe, so that as the same passes under the openings 19, the air will pass through the blow pipe.

In operation, the operator after securing the gathering upon the blow pipe, inserts the body of the same through the opening 14 in the revoluble carrier, allowing the enlargement upon the blow pipe to seat in the depression 15 in the ring of the carrier, it being understood that the revoluble carrier revolves continuously, the upper end of the pipe passing into the guide way 18, and as it passes beneath the openings 19, the air passes through the blow pipe and gives the desired form to the article thereon, the movement of the blow pipe elongating the gathering to give the desired length to the same. After the pipe has made substantially a complete revolution, it is removed and the article detached therefrom, and another pipe inserted and the operation continued.

It will be seen by referring to Fig. 2, that the openings 19 are of different distances apart, and also vary in size. This is necessary to secure an article of any desired form, it being understood that to change the form the air receptacle is changed and one having the necessary openings to make the desired form is secured upon the frame. It will be seen also that, in blowing molded ware, I may employ a revoluble carrier 20 (shown in Fig. 6) secured upon the shaft 5 and carrying molds 21, the molds being in vertical line with the recesses 14 upon the revoluble carrier 10, the operation being the same. It will also be seen that in using a paste mold, I may employ mechanism to revolve the blow pipe or the mold without departing from the spirit of my invention.

While I have shown a revoluble carrier 10, I may revolve the air receptacle, the carrier and blow pipes being stationary. I may also provide a straight carrier and air receptacle, inserting the blow pipe at one end and removing the same upon the opposite side, without departing from the spirit of my invention, the invention consisting in a blow pipe and a receptacle having openings to admit the necessary air through the blow pipe to give the desired form to the article upon the same.

It will be seen that by my apparatus the blower is dispensed with, thereby reducing the cost of the ware to a minimum, and that by forming each article mechanically by the same operation each completed article is formed alike.

What I claim is—

1. In an apparatus for blowing glass, a blow pipe, an air receptacle containing a plurality of openings of the desired arrangement and size to form any desired shaped article, and means for mechanically bringing the blow pipe and openings in co-incidence whereby an article is formed.

2. In an apparatus for blowing glass, a stationary receptacle for air having openings and means for forcing air into the receptacle, a revoluble carrier, a blow pipe carried thereby to be revolved under the openings in the receptacle to form an article thereon in the desired shape.

3. In an apparatus for blowing glass, a receptacle having a guide way, openings in the guide way, a revoluble holder, a blow pipe, means for securing the same whereby it is held and revolved, the upper end revolving in the guide way in the receptacle.

4. In an apparatus for blowing glass, an air receptacle having a guide way, openings therein, a revoluble holder having a depression, a recess connecting the same with the periphery of the holder, a blow pipe having an enlargement thereon to seat in the depression, the upper end resting in the guide-way whereby when the holder is revolved, the pipe is caused to pass under the openings in the guide way to give the desired form to the article.

In testimony that I claim the foregoing as my own I hereby affix my signature in presence of two witnesses.

MICHAEL J. OWENS.

Witnesses:
CARROLL J. WEBSTER,
BERTHA M. SCHWEIZER.